(12) United States Patent
Otoguro

(10) Patent No.: US 7,684,099 B2
(45) Date of Patent: Mar. 23, 2010

(54) OPTICAL SCANNING DEVICE AND IMAGE FORMING APPARATUS

(75) Inventor: Yasuaki Otoguro, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/385,588

(22) Filed: Apr. 13, 2009

(65) Prior Publication Data

US 2009/0231657 A1 Sep. 17, 2009

Related U.S. Application Data

(63) Continuation of application No. 12/248,848, filed on Oct. 9, 2008, now Pat. No. 7,522,326.

(30) Foreign Application Priority Data

Oct. 17, 2007 (JP) .............................. 2007-270415

(51) Int. Cl.
*G02B 26/08* (2006.01)
(52) U.S. Cl. .............. 359/216.1; 359/201.2; 359/204.1; 347/261
(58) Field of Classification Search .... 359/216.1–219.2
See application file for complete search history.

(56) References Cited

U.S. PATENT DOCUMENTS

| 4,630,130 | A | 12/1986 | Parisi | 358/300 |
| 7,522,324 | B2 * | 4/2009 | Shimomura | 347/259 |
| 7,522,326 | B1 * | 4/2009 | Otoguro | 347/261 |
| 2006/0092493 | A1 | 5/2006 | Yoshikawa et al. | 359/216 |
| 2008/0094678 | A1 | 4/2008 | Uduki | 359/204 |

FOREIGN PATENT DOCUMENTS

| JP | 2001-264655 | 9/2001 |
| JP | 2004-21138 | 1/2004 |

* cited by examiner

*Primary Examiner*—James Phan
(74) *Attorney, Agent, or Firm*—Fitzpatrick, Cella, Harper & Scinto

(57) ABSTRACT

In an optical scanning device, a rotational axis of a first rotary polygon mirror and a rotational axis of a second rotary polygon mirror are inclined toward the same side with respect to a direction perpendicular to a reference plane inclusive of each of center axes of a first member to be scanned and a second member to be scanned, as viewed in directions of the center axes of the first member to be scanned and the second member to be scanned. As a consequence, a width in an arrangement direction of a plurality of rotary polygon mirrors can be reduced, thus achieving miniaturization without degrading a quality of an image in an image forming apparatus.

11 Claims, 5 Drawing Sheets

OPTICAL SCANNING DEVICE AND IMAGE FORMING APPARATUS

This application is a continuation of U.S. application Ser. No. 12/248,848, filed Oct. 9, 2008, which issued as U.S. Pat. No. 7,522,326 on Apr. 21, 2009, the contents of which are incorporated herein by reference.

BACKGROUND OF THE INVENTION

1. Field of the Invention

The present invention relates to an optical scanning device which introduces light beams to a plurality of image forming portions in an image forming apparatus such as a laser beam printer or a digital copying machine, and an image forming apparatus.

2. Description of the Related Art

In general, an optical scanning device includes an optical box 31, as illustrated in FIG. 4. Inside of the optical box 31 are housed a light source unit 35 having a semiconductor laser or a collimator lens unified as a unit and a cylindrical lens 39 which converts a laser beam of a collimated optical flux illuminated by the light source unit 35 into a convergent beam. There is further provided a rotary polygon mirror 36 which deflects and scans the convergent light beam emitted from the cylindrical lens 39.

In addition, inside of the optical box 31 are housed image focusing lenses 37 which focus the deflected and scanned laser beam into an image and a returning mirror 38 which reflects a light beam emitted from the image focusing lens 37 and returns it. Moreover, there are provided four photosensitive drums (i.e., image carriers) 2 illuminated with the light beam reflected on the returning mirror 38.

The laser beam emitted from the light source unit 35 is linearly focused on a reflection surface of the rotary polygon mirror 36 by the cylindrical lens 39. The laser beam is reflected on the reflection surface of the rotary polygon mirror 36, and then, illuminates the electrically charged photosensitive drum 2 via the image focusing lens 37 and the returning mirror 38 in sequence.

At this time, the laser beam scans a surface to be scanned of the photosensitive drum 2 in main scanning direction, which is perpendicular to a direction of the rotation of the photosensitive drum 2, by a uniform motion of the rotary polygon mirror 36 and scans it in sub-scanning direction which is a direction of the rotation of the photosensitive drum 2, by the rotation of the photosensitive drum 2. In this manner, the surface to be scanned of the photosensitive drum 2 is exposed to the light beam, thereby forming an electrostatic latent image. Thereafter, the electrostatic latent image is developed to a visible image, which is then transferred and fixed to a sheet.

In the above-described optical scanning device, there has been known the following configuration. That is to say, four rotary polygon mirrors corresponding to the four photosensitive drums are disposed independently of each other, and they deflect and scan the light beam, to thus form an electrostatic latent image on the photosensitive drum (see Japanese Patent Laid-Open 2004-021138, hereinafter "Patent Literature 1").

Otherwise, an optical scanning device illustrated in FIG. 5 is a type having a so-called 2-in-1 configuration which one rotary polygon mirror 41 deflects and scans a light beam with respect to two optical paths in order to save a space.

However, a plurality of rotary polygon mirrors 41a and 41b are arranged in series in either of a configuration disclosed in Patent Literature 1 and the 2-in-1 configuration, and therefore, a width in an arrangement direction of the rotary polygon mirrors becomes larger, thereby increasing the widthwise size of the image forming apparatus. Alternatively, an image forming apparatus can be reduced in width but needs twice or more space in a height direction in a configuration in which the optical scanning devices are superimposed in the height direction, like the configuration in Patent Literature 1.

In view of this, a light beam is emitted at four different angles in a sub-scanning direction by one rotary polygon mirror, and then, four photosensitive drums are independently illuminated via returning mirrors corresponding to optical paths, respectively (see Japanese Patent Laid-Open 2001-264655, hereinafter "Patent Literature 2").

However, a distance from the center of a rotational axis to a reflection surface may be varied per surface according to an error of a machining accuracy of the rotary polygon mirror in an optical scanning device disclosed in Patent Literature 2. In this case, in this configuration in which the light beam is incident slantwise into one rotary polygon mirror in the sub-scanning direction, there arises a situation in which a dot position on the photosensitive drum is deviated per surface in the sub-scanning direction, thereby markedly degrading a quality of an image.

With this being the situation, it may be construed that an interference of a light beam in an arrangement direction of a plurality of rotary polygon mirrors is prevented by not inclining an angle of a light beam incident into a rotary polygon mirror but inclining a rotational axis of at least either one rotary polygon mirror. However, when the inclinations of the rotational axes of the rotary polygon mirrors are different from each other, deviations at scanning positions depend upon the rotary polygon mirrors, thereby growing concern about a quality of an image.

SUMMARY OF THE INVENTION

The present invention provides an optical scanning device and an image forming apparatus, in which a widthwise size in an arrangement direction of rotary polygon mirrors can be reduced while securing a high quality of an image in the image forming apparatus.

An optical scanning device according to the present invention comprises:

a first rotary polygon mirror which deflects and scans a first laser beam with respect to a first member to be scanned;

a second rotary polygon mirror which deflects and scans a second laser beam with respect to a second member to be scanned;

a plurality of mirrors which reflect thereon the laser beams deflected and scanned by the first and second rotary polygon mirrors; and optical boxes which house therein the first and second rotary polygon mirrors and the plurality of mirrors;

wherein a rotational axis of the first rotary polygon mirror and a rotational axis of the second rotary polygon mirror are inclined toward the same side, as viewed in directions of center axes of the first member to be scanned and the second member to be scanned with respect to a direction perpendicular to the reference plane inclusive of each of the center axes of the members to be scanned.

An image forming apparatus according to the present invention comprises:

a first rotary polygon mirror which deflects and scans a first laser beam with respect to a first image carrier, to thus form an electrostatic latent image;

a second rotary polygon mirror which deflects and scans a second laser beam with respect to a second image carrier, to thus form an electrostatic latent image;

a plurality of mirrors which reflect thereon the laser beams deflected and scanned by the first and second rotary polygon mirrors;

optical boxes which house therein the first and second rotary polygon mirrors and the plurality of mirrors;

a developing device which develops the electrostatic latent image into a toner image; and a plurality of transferring units which transfer the toner image formed on the first image carrier and the toner image formed on the second image carrier onto a member to be transferred;

wherein a rotational axis of the first rotary polygon mirror and a rotational axis of the second rotary polygon mirror are inclined toward the same side, as viewed in directions of center axes of the image carriers with respect to a direction perpendicular to a reference plane inclusive of the plurality of transferring units.

According to the present invention, the rotational axis of the first rotary polygon mirror and the rotational axis of the second rotary polygon mirror are inclined toward the same side with respect to a direction perpendicular to the reference plane inclusive of each of the center axes of the first member to be scanned and the second member to be scanned, as viewed in directions of the center axes of the first member to be scanned and the second member to be scanned. As a consequence, the width in the arrangement direction of the plurality of rotary polygon mirrors can be reduced, thus achieving miniaturization without degrading a quality of an image in the image forming apparatus.

Further features of the present invention will become apparent from the following description of exemplary embodiments (with reference to the attached drawings).

DESCRIPTION OF THE EMBODIMENTS

A detailed description will be given below of embodiments according to the present invention in reference to the attached drawings.

First Embodiment

Figure 1:
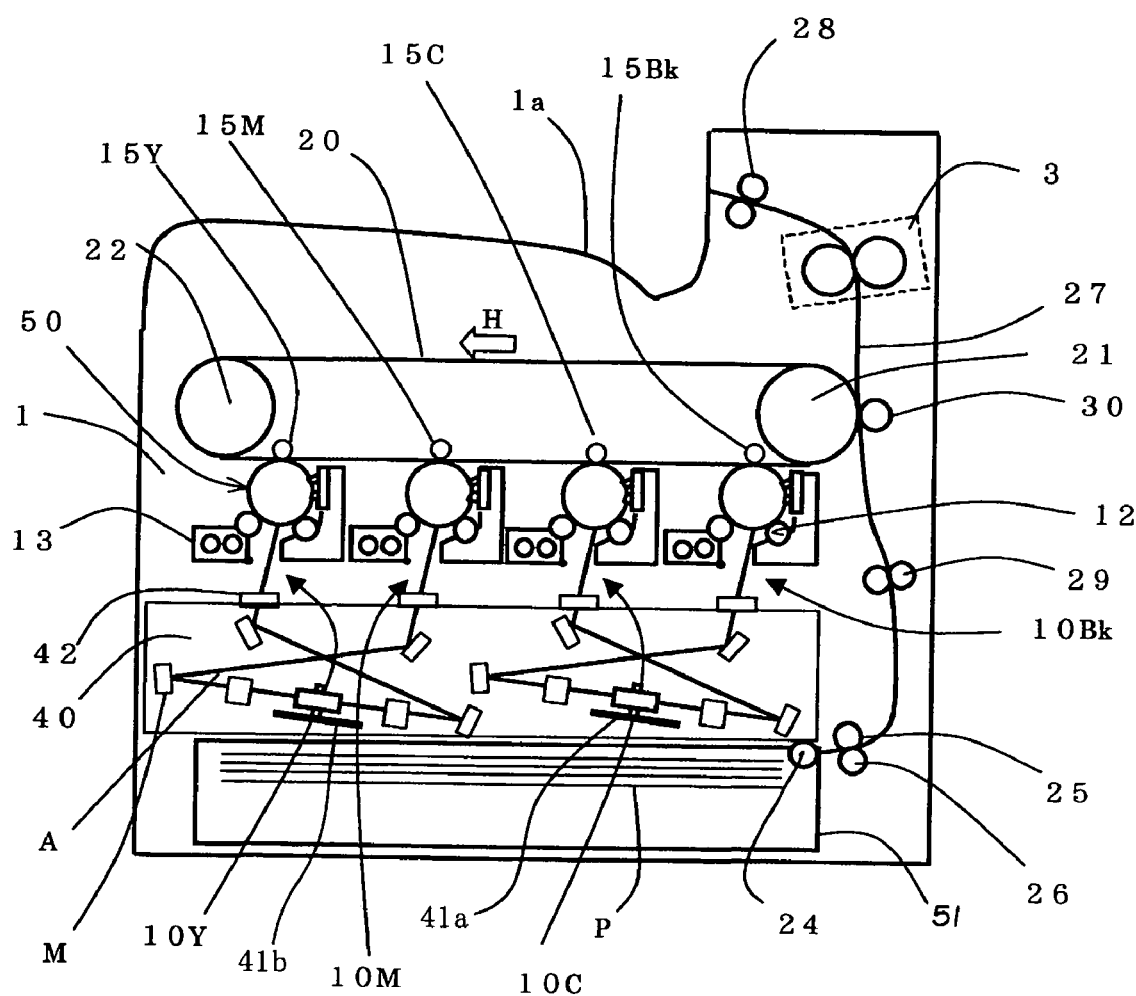
FIG. 1 is a view schematically illustrating a configuration of an image forming apparatus in an embodiment according to the present invention.
Figure 2:
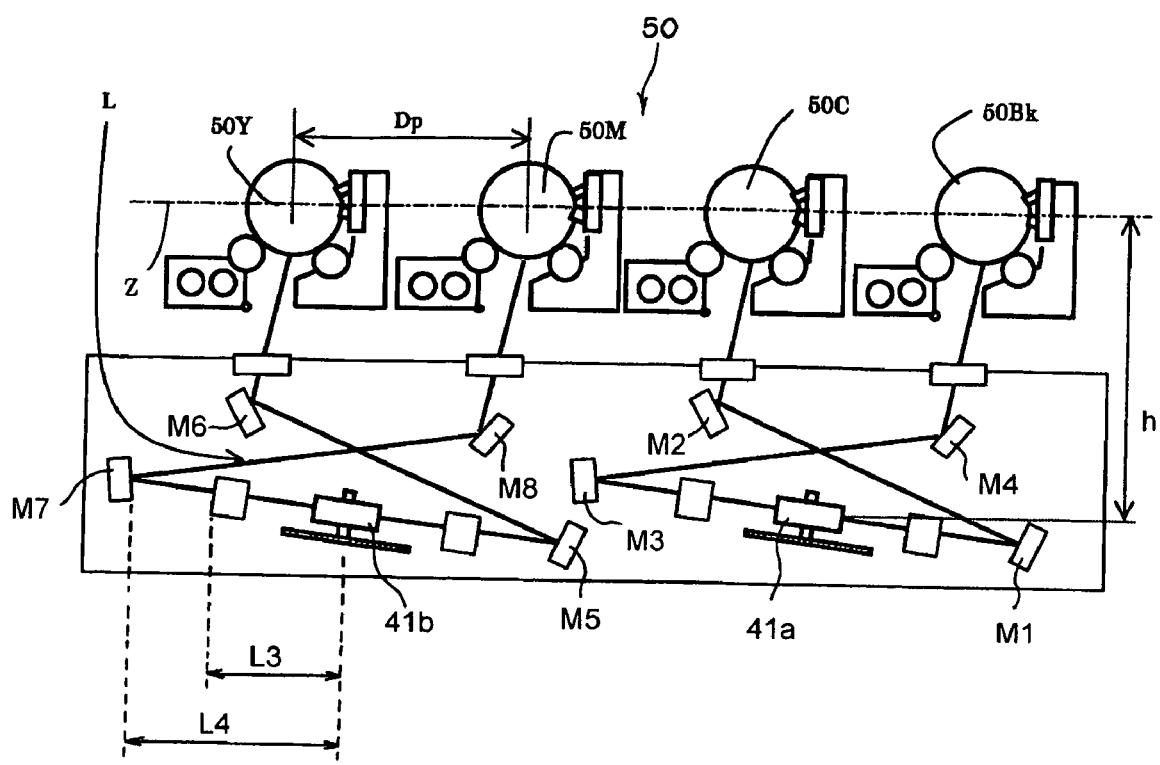
FIG. 2 is a view schematically illustrating a configuration of an optical scanning device in the image forming apparatus illustrated in FIG. 1.

FIG. 1 is a view schematically illustrating a configuration of a laser beam printer serving as an image forming apparatus in an embodiment according to the present invention; and FIG. 2 is a view schematically illustrating a configuration of an optical scanning device in the laser beam printer.

The laser beam printer illustrated in FIG. 1 includes four operating engines 10Y, 10M, 10C and 10Bk which form toner images of yellow, magenta, cyan and black colors, respectively. Moreover, there is provided an intermediate transfer belt (IBT) 20, onto which the toner images are primarily transferred from the operating engines 10Y, 10M, 10C and 10Bk. The toner images transferred onto the intermediate transfer belt 20 in a multiple manner are secondarily transferred onto a recording sheet P, thereby forming a full-color image.

The intermediate transfer belt 20 is formed in an endless manner, and further, is stretched across a pair of belt conveying rollers 21 and 22. The intermediate transfer belt 20 is subjected to the primary transferring of the toner images formed in the operating engines 10Y, 10M, 10C and 10Bk while being rotationally operated in a direction indicated by an arrow H.

A secondary transferring roller 30 is disposed at a position facing the belt conveying roller 21 while holding nip the intermediate transfer belt 20. The recording sheet P is inserted between the transferring roller 30 and the intermediate transfer belt 20 which are brought into press-contact with each other, and then, is subjected to the secondary transferring of the toner image from the intermediate transfer belt 20.

Under the intermediate transfer belt 20 are arranged the four operating engines 10Y, 10M, 10C and 10Bk in parallel to each other, thereby primarily transferring the toner images formed according to image information on the colors onto the intermediate transfer belt 20.

These four operating engines 10Y, 10M, 10C and 10Bk are arranged in the order of yellow, magenta, cyan, and black along the rotational direction of the intermediate transfer belt 20. Here, the operating engine 10Bk for the black color which is to be most frequently used is disposed nearest a secondary transfer position.

Under the operating engines 10Y, 10M, 10C and 10Bk is disposed an optical scanning device 40 which exposes a photosensitive drum 50 provided in each of the operating engines to a light beam in accordance with the image information. The optical scanning device 40 is used commonly to all of the operating engines 10Y, 10M, 10C and 10Bk. The optical scanning device 40 has four semiconductor lasers, not illustrated, which emit light beams A modulated in accordance with the pieces of image information on the colors, and rotary polygon mirrors 41a and 41b which scan the light beams A on four optical paths along an axial direction of the photosensitive drums 50 while being rotated at a high speed. The laser beams from the semiconductor lasers scans a surface to be scanned of the photosensitive drums 50 in main scanning direction, which is perpendicular to a direction of the rotation of the photosensitive drums 50, by a uniform motion of the rotary polygon mirror 41a and 41b.

Each of the light beams A scanned by the rotary polygon mirrors 41a and 41b travels on predetermined paths while being reflected on reflection mirrors M1 to M8 disposed on the optical paths, respectively. Thereafter, the photosensitive drum 50 of each of the operating engines 10Y, 10M, 10C and 10Bk is exposed to the light beam through an illumination port 42 formed at an upper portion of the main body of the optical scanning device 40. The laser beams from the semiconductor lasers scans the photosensitive drums 50 in sub-scanning direction which is a direction of the rotation of the photosensitive drums 50, by the rotation of the photosensitive drums 50.

Additionally, each of the operating engines 10Y, 10M, 10C and 10Bk includes the photosensitive drum 50 and a charging roller 12 which electrically charges the photosensitive drum 50 up to a uniform background potential. Moreover, each of the operating engines 10Y, 10M, 10C and 10Bk includes a developing device 13 which develops an electrostatic latent image formed on the photosensitive drum 50 by the exposure to the light beam A so as to form the toner image. In this manner, each of the operating engines 10Y, 10M, 10C and 10Bk is configured in such a manner as to form the toner image on the photosensitive drum 50 in accordance with the image information on each of the colors.

The developing device 13 is of a type which uses a two-component developer incorporating a toner and a carrier in mixture. In order to omit maintenance of replacement of the developer due to degradation with time, there is used a development system in which another developer incorporating a toner and a carrier in mixture is replenished from a replenishing cartridge, not illustrated, and then, the degraded developer is automatically discharged.

At positions facing the photosensitive drum 50 in the operating engines 10Y, 10M, 10C and 10Bk are disposed primary transferring rollers 15Y, 15M, 15C and 15Bk in such a manner nip as to hold the intermediate transfer belt 20. A predetermined transfer bias voltage is applied to each of the primary transferring rollers 15Y, 15M, 15C and 15Bk. As a consequence, an electric field is formed between the photosensitive drum 50 and each of the primary transferring rollers 15Y, 15M, 15C and 15Bk. Moreover, the electrically charged toner image on the photosensitive drum 50 is to be transferred onto the intermediate transfer belt 20 by Coulomb force.

In the meantime, the recording sheet P is supplied from a sheet cassette 51 housed in a lower portion of a printer casing 1 to the inside of the printer, specifically, to the secondary transfer position at which the intermediate transfer belt 20 and the secondary transferring roller 30 are brought into contact with each other.

The sheet cassette 51 is configured in such a manner as to be pushed into the lower portion of the printer casing 1 sideways of the printer casing. At the upper portion of the set sheet cassette 51 are disposed in parallel a pickup roller 24 for drawing the recording sheet P stacked in the cassette 51, and a feed roller 25. In addition, at a position facing the feed roller 25 is disposed a retard roller 26 which prevents any dual feed of the recording sheets P.

A conveying path 27 for the recording sheet P inside of the printer is disposed substantially vertically along a right side of the printer casing 1. The recording sheet P drawn from the sheet cassette 51 positioned at the bottom of the printer casing 1 is moved upward on the sheet conveying path 27, and then, is fed to a registration roller 29 which controls an entry timing of the recording sheet P at the secondary transfer position. Thereafter, the recording sheet P is subjected to the transferring of the toner image at the above-described secondary transfer position, and then, is fed to a fixing unit 3 disposed right above the secondary transfer position.

The recording sheet P, to which the toner image is fixed by the fixing unit 3, is discharged onto a discharge tray 1a disposed at an upper portion of the printer casing 1 via a pair of discharge roller 28.

In forming the full color image by the laser beam printer such configured as described above, the optical scanning device 40 first exposes the photosensitive drum 50 in each of the operating engines 10Y, 10M, 10C and 10Bk to the light beam at a predetermined timing in accordance with the image information on each of the colors. In this manner, the toner image in accordance with the image information is formed on the photosensitive drum 50 in each of the operating engines 10Y, 10M, 10C and 10Bk.

The toner images formed by the operating engines 10Y, 10M, 10C and 10Bk are transferred in sequence onto the rotating intermediate transfer belt 20. Therefore, a multiple toner image having the toner images of the colors superimposed on each other is formed on the intermediate transfer belt 20.

In the meantime, the recording sheet P is fed out from the sheet cassette 51 at a predetermined timing, and then, is inserted between secondary transferring roller 30 and the intermediate transfer belt 20 while watching a timing at which the toner image primarily transferred on the intermediate transfer belt 20 reaches the secondary transfer position.

In this manner, the multiple toner image formed on the intermediate transfer belt 20 is secondarily transferred onto the recording sheet P. The recording sheet P subjected to the secondary transferring is subjected to the fixture of the toner image by the fixing unit 3, thereby completing the full color image on the recording sheet P.

FIG. 2 is a view schematically illustrating, in enlargement, the configuration of the optical scanning device loaded on the laser beam printer.

In FIG. 2, in the optical scanning device are disposed at predetermined pitches the plurality of photosensitive drums 50Y, 50M, 50C and 50Bk serving as members to be scanned such that their center axes are arranged in the same direction as each other. The photosensitive drums 50Y, 50M, 50C and 50Bk are disposed at equal pitches Dp (i.e., drum pitches) in such a manner that images are not deviated due to an eccentric influence of a roller for driving the ITB belt, not illustrated.

In order to configure the laser beam printer in a small size, the optical scanning device 40 is configured such that the light beams reflected on one of the rotary polygon mirrors 41a and 41b in a direction substantially opposite to each other cross downstream of the optical path. In this manner, the optical path can be efficiently turned in a small space by crossing the light beams, resulting in space savings in the apparatus.

The light beams incident into the rotary polygon mirrors 41a and 41b cannot be adversely influenced by a difference in distance at each of surfaces from the rotary axes to the deflection surfaces, and therefore, they are incident perpendicularly to a sub-scanning direction with respect to the deflection surface. Furthermore, in order to achieve the space savings, the optical scanning device has a configuration of a so-called 2-in-1 type such that one rotary polygon mirror 41a (41b) deflects and scans the light beam into the two optical paths in such a manner as to scan different photosensitive members.

For example, a rotary polygon mirror 41 serving as a first rotary polygon mirror is configured in such a manner as to scan two lasers serving as first laser beams on photosensitive drums 50Y and 50M, respectively. In the meantime, another rotary polygon mirror 41 serving as a second rotary polygon mirror is configured in such a manner as to scan two lasers serving as second laser beams on photosensitive drums 50C and 50Bk, respectively.

The rotary axes of the rotary polygon mirrors 41a and 41b housed inside of the laser beam printer are provided as follows: the rotary axes of the plurality of rotary polygon mirrors 41a and 41b are provided in such a manner as to be inclined in the same direction as a direction perpendicular to a plane (i.e., a reference plane Z) including the center axes of the photosensitive drums, as viewed in the direction of the center axes of the photosensitive drums 50Y, 50M, 50C and 50Bk. the center axes of the photosensitive drums is parallel to each other.

The reference plane Z includes both of a center axis of the photosensitive drum 50Y serving as a first member to be scanned and a center axis of the photosensitive drum 50C serving as a second member to be scanned. The rotary polygon mirrors 41a and 41b are disposed at substantially the same height inside of an optical box 49 while preventing an increase in size of the apparatus in the height direction.

That is to say, the arrangement direction of the rotary polygon mirrors 41a and 41b are substantially parallel to the reference plane. Here, the arrangement direction of the rotary polygon mirrors signifies a direction in which the centers of the rotary polygon mirrors are connected to each other, wherein the center of the rotary polygon mirror is a point at which a plane passing the deflection point of the rotary polygon mirror (i.e., a deflection/scanning position) and having the rotary axis of the rotary polygon mirror as a normal crosses the rotary axis of the rotary polygon mirror.

The reference plane Z may be a plane including a plurality of transferring portions at which the toner image formed on the photosensitive drum 50 in each of the operating engines 10Y, 10M, 10C and 10Bk is transferred onto the intermediate transfer belt 20. In this case, the rotary axes of the plurality of rotary polygon mirrors 41a and 41b are provided in such a manner as to be inclined in the same direction as a direction perpendicular to the reference plane Z including the plurality of transferring portions, as viewed in the direction of the center axes of the photosensitive drums 50Y, 50M, 50C and 50Bk.

In this manner, the rotary polygon mirrors 41a and 41b are inclined wither respect to the reference plane Z, so that the apparatus can be reduced in size in a horizontal direction (i.e., in a widthwise direction) more than the case where the arrangement direction of the rotary polygon mirrors is parallel to the reference plane Z.

The right and left rotary polygon mirrors are inclined in the same direction, so that the behaviors of optical rays scanned by the right and left rotary polygon mirrors become substantially the same as each other when a temperature inside of the apparatus is fluctuated. Thus, it is possible to simplify a correction method even in the case where a positional deviation of a scanning ray between stations due to the fluctuation of the temperature.

With the configuration in which the rotary polygon mirrors 41a and 41b are arranged substantially in parallel to the arrangement direction of the photosensitive drums 50Y, 50M, 50C and 50Bk, the adjacent reflection mirrors M3 and M5 and the adjacent reflection mirrors M2 and M8 need be deviated in the axial direction of the rotary polygon mirrors 41a and 41b in order to avoid any interference therebetween in the case where the pitches between the photosensitive drums 50Y, 50M, 50C and 50Bk is to be reduced. Therefore, the height of the optical scanning device inevitably becomes greater.

In the present embodiment, it is possible to avoid the interferences between the reflection mirrors M3 and M5 and the reflection mirrors M2 and M8 with the inclination of the rotary polygon mirrors 41a and 41b even in the case where the pitches between the photosensitive drums 50Y, 50M, 50C and 50Bk is to be reduced (FIG. 2), thereby avoiding any increase in height of the optical scanning device. In this manner, the installation space required for the optical scanning device can be reduced, and as a result, the image forming apparatus can be reduced in size.

Specifically, the reflection mirrors M3 and M5 reflecting the optical beams deflected and scanned by the plurality of rotary polygon mirrors 41a and 41b are superimposed in substantially the vertical direction with respect to the arrangement direction of the rotary polygon mirrors 41a and 41b, as illustrated in FIG. 2. Moreover, the reflection mirror M3 is located leftward of a position illustrated in FIG. 3 to such an extent as not to be brought into contact with the reflection mirror M8, so that a part of the light beam incident into and reflected on the reflection mirror M3 and a part of the light beam incident into and reflected on the reflection mirror M5 are superimposed in substantially the vertical direction with respect to the arrangement direction of the rotary polygon mirrors 41a and 41b. In this manner, the apparatus can be further reduced in size in the horizontal direction.

The inclination angle of each of the rotary polygon mirrors 41a and 41b is desirably set to 5° or more (preferably, from 5° to 40°) in consideration of the avoidance of an interference by optical parts, the size of moldable optical parts, and the arrangement of parts satisfying optical performance required for image formation.

The light beams deflected and scanned by the rotary polygon mirrors 41a and 41b are turned on the reflection mirror M. At this time, it is necessary to avoid the turned light beams from being incident into the lens or the rotary polygon mirrors 41a and 41b, through which the light beams have already passed. Additionally, the lifetime of a motor is shortened as the angles of the rotary polygon mirrors 41a and 41b becomes greater. In view of this, the inclination angle should be desirably 40° or less.

The light beams deflected and scanned by the rotary polygon mirrors 41a and 41b are turned a plurality of times in such a manner that the length L of an optical path from the deflection point to the image focus on the photosensitive drums 50Y, 50M, 50C and 50Bk is housed inside of the apparatus.

If the light beam is reflected on the reflection mirror M many times, the loss of a light quantity becomes large or an adverse influence is exerted on a spot and a dot position by unevenness of the reflection mirror M. Therefore, the times of the reflection are desirably small. Here, there is no freedom of the optical paths to the photosensitive drums 50Y, 50M, 50C and 50Bk if only one reflection mirror M is disposed on one optical path, and therefore, two reflection mirrors M are disposed on one optical path in such a manner that the optical path is turned in the optical scanning device.

Taking the length L of the optical path into consideration, although the freedom of the arrangement is enhanced as a remarkably shorter length L of the optical path is designed, the length L of the optical path greatly depends upon the angle at which the deflection and scanning can be performed, that is, the number of the surfaces of the rotary polygon mirrors 41a and 41b. In order to satisfy optical characteristics such as a spot diameter required for the image forming apparatus, there is a limitation in the length L of the optical path which can be shortened in accordance with an optical design.

The hexagonal rotary polygon mirrors 41a and 41b are used in the present embodiment, and further, the smallest length L of the optical path capable of satisfying the characteristics from the viewpoint of the optical design was 255.5 mm from the deflection point to the surfaces of the photosensitive drums 50Y, 50M, 50C and 50Bk.

In order to miniaturize the optical scanning device and the image forming apparatus, it is necessary to reduce the pitches Dp between the photosensitive drums 50Y, 50M, 50C and 50Bk and the height of the optical scanning device. Here, reference character Dp designates the pitch between the photosensitive drums; h, a distance from a surface to be scanned to the deflection point in the direction perpendicular to the arrangement of the drums; and L2, a length obtained by adding a radius distance of a deflector to the length of the optical path from the deflection point to the surface to be scanned.

Since the arrangement direction of the rotary polygon mirrors 41a and 41b is substantially parallel to the arrangement direction of the drums, an interference by the mirror in the vicinity of the optical scanning device must be avoided when the optical scanning devices of the 2-in-1 configuration having the same arrangement are to be disposed on right and left sides. Therefore, a distance L4 from the center of the deflector to the mirror reflection point M7 (M1, M3 or M5) at which the emitted light beam is turned must be shorter than the pitch Dp between the photosensitive drums.

Moreover, a distance L3 from a downstream surface to the rotary axis of the rotary polygon mirror becomes 0.19×L2 to 0.22×L2 on an optical path of an fθ lens for converting the optical path in such a manner that a velocity of a beam for scanning the photosensitive drum becomes constant in consideration of the optical characteristics.

Here, when the height is to be reduced since the light beam reflected on the mirror reflection point M7 must take an optical path which cannot be shielded by the fθ lens, the angle is uniformly determined. Upon calculation of conditions required for arranging the rotary polygon mirrors 41a and 41b in parallel, it is found that it is necessary to satisfy the relationship expressed by an inequality: 0.32×L2<Dp<0.8×h. Incidentally, the angle was 23.4° in the configuration in the present embodiment.

From this, in the situation of 0.32×L2≧Dp≧0.8×h, the horizontal arrangement of the optical scanning device of the 2-in-1 configuration is difficult, and therefore, other configurations need be devised.

In the configuration in the present embodiment illustrated in FIG. 2, the rotary polygon mirrors are disposed slantwise with respect to the arrangement direction of the drums, and further, the reflection mirrors M located nearest the right and left optical scanning devices are superimposed perpendicularly to the arrangement direction of the drums. As a consequence, also in the situation of 0.32×L2≧Dp≧0.8×h, the incidence into the rotary polygon mirrors 41a and 41b can satisfy the configuration of the incidence perpendicularly in the sub-scanning direction. In this manner, the width and height of the image forming apparatus can be reduced in addition to a high quality of an image.

Second Embodiment

Figure 3:
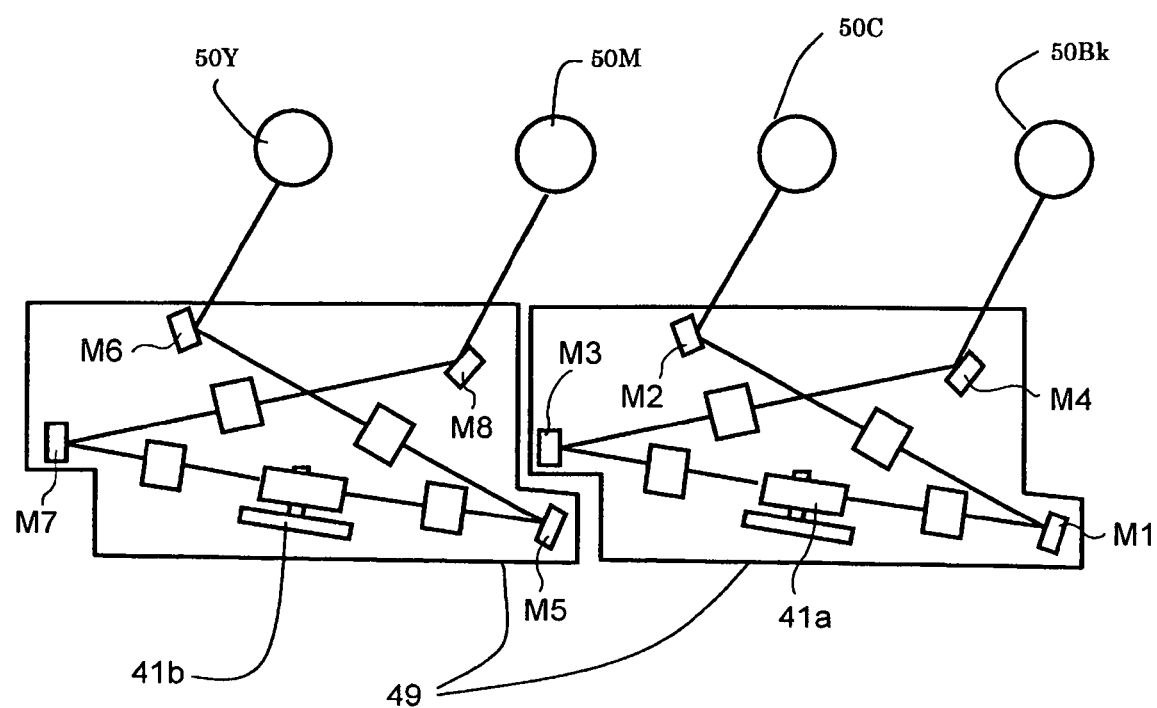
FIG. 3 is a view schematically illustrating a configuration of an optical scanning device in another embodiment according to the present invention.
Figure 4:
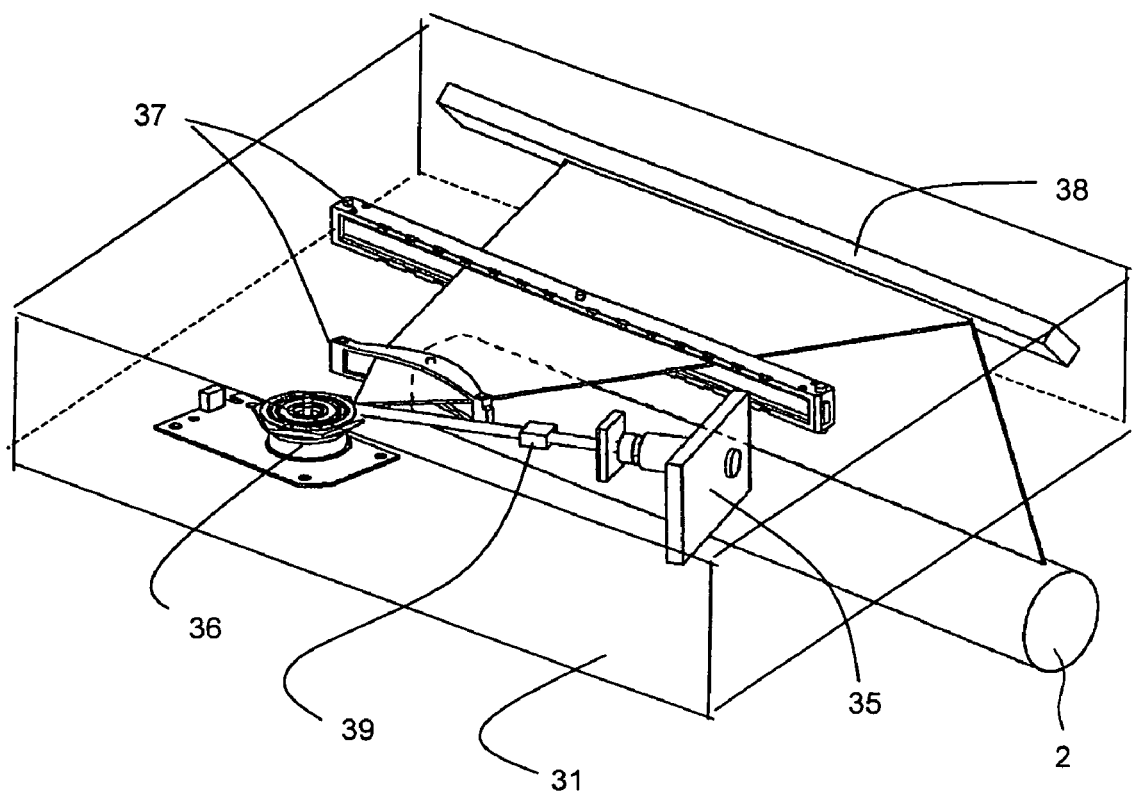
FIG. 4 is a perspective view schematically illustrating an optical scanning device in the prior art.
Figure 5:
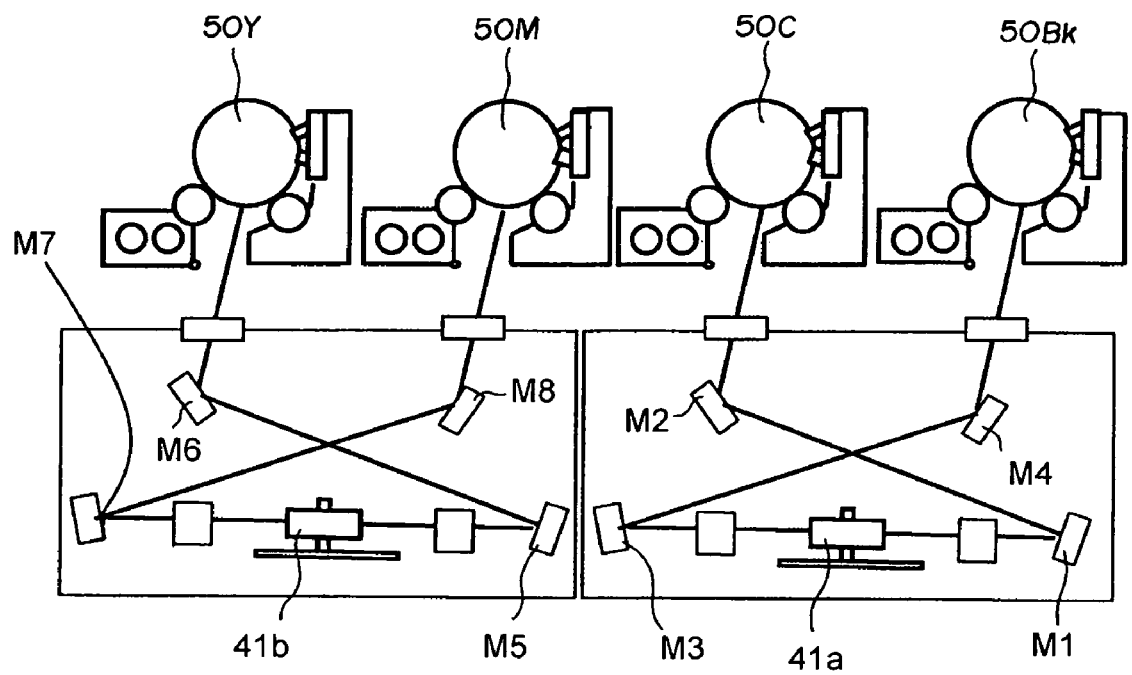
FIG. 5 is a view schematically illustrating a configuration of the optical scanning device in the prior art.

FIG. 3 is a view schematically illustrating a configuration of an optical scanning device in another embodiment.

In FIG. 3, a light beam incident into rotary polygon mirrors 41a and 41b cannot be adversely influenced by a difference in distance at each of surfaces from a rotary axis to a deflection surface since it is incident perpendicularly to the deflection surface. Furthermore, in order to achieve space savings, the optical scanning device has a so-called 2-in-1 configuration in which one of rotary polygon mirrors 41a and 41b deflects and scans the light beam with respect to the two optical paths.

In FIG. 3, a scanner case (i.e., an optical box) 49 is a frame, which guides a light beam deflected and scanned by one of the rotary polygon mirrors 41a and 41b to a surface to be scanned, and supports optical parts for focusing the light beam. Among reflection mirrors M, the reflection mirrors M located at a most adjacent position and the scanner cases 49 which support the reflection mirrors M are configured such that they are superimposed in substantially a vertical direction on a reference plane Z, respectively. In this case, the reflection mirrors M (M1 to M8) reflect the light beam deflected and scanned from the rotary polygon mirror 41 housed inside of the scanner case 49.

As a consequence, it is possible to miniaturize the optical scanning device, and further, to reduce the size of the scanner case 49 so as to increase a proper value, thereby avoiding any adverse influence due to vibrations generated inside or outside of the image forming apparatus.

In this manner, the present embodiment is configured such that the support postures of the plurality of rotary polygon mirrors 41 arranged in a predetermined direction are set slantwise in substantially the same direction and the light beams deflected and scanned by the rotary polygon mirrors 41 and the reflection mirrors M are superimposed in substantially a direction perpendicular to the predetermined direction. As a consequence, the optical scanning device can be miniaturized.

Additionally, the plurality of rotary polygon mirrors 41 are securely held in the plurality of different scanner cases 49, parts of the plurality of scanner cases 49 are superimposed in the vertical direction at portions at which the light beams or the reflection mirrors M are superimposed in substantially the direction perpendicular to the predetermined direction. That is to say, a first rotary polygon mirror and a second rotary polygon mirror are housed inside of the independent optical boxes, respectively. Therefore, a proper value of the scanner case 49 can be increased, thus suppressing an adverse influence due to the vibrations generated inside and outside of the image forming apparatus.

While the present invention has been described with reference to exemplary embodiments, it is to be understood that the invention is not limited to the disclosed exemplary embodiments.

The scope of the following claims is to be accorded the broadest interpretation so as to encompass all such modifications and equivalent structures and functions.

This application claims the benefit of Japanese Patent Application No. 2007-270415, filed Oct. 17, 2007, which is hereby incorporated by reference herein in its entirety.

What is claimed is:

1. An optical scanning device comprising:
    a first rotary polygon mirror which deflects and scans a first laser beam with respect to a first member to be scanned, the first member has a center axis of rotation;
    a second rotary polygon mirror which deflects and scans a second laser beam with respect to a second member to be scanned, the second member has a center axis of rotation which is parallel to the axis of rotation of the first member;
    a plurality of mirrors which reflect thereon the laser beams deflected and scanned by the first and second rotary polygon mirrors; and
    an optical box which houses therein the first and second rotary polygon mirrors and the plurality of mirrors;
    wherein a rotational axis of the first rotary polygon mirror and a rotational axis of the second rotary polygon mirror are inclined toward the same side, as viewed in directions of the center axis of the first member to be scanned and the center axis of the second member to be scanned with respect to a direction perpendicular to a reference plane inclusive of each of the center axes of the members to be scanned; and
    wherein the first rotary polygon mirror deflects and scans a third laser beam with respect to a third member to be scanned, and the second rotary polygon mirror deflects and scans a fourth laser beam with respect to a fourth member to be scanned.

2. An optical scanning device according to claim 1, wherein the third laser beam is deflected by the first rotary polygon mirror in an opposite direction of the first laser beam, and
    wherein the fourth laser beam is deflected by the second rotary polygon mirror in an opposite direction of the second laser beam.

3. An optical scanning device according to claim 1, wherein some mirrors among the mirrors disposed between the first and second rotary polygon mirrors overlap each other with respect to a direction perpendicular to the reference plane inclusive of each of the center axes of the members to be scanned.

4. An optical scanning device according to claim 1, wherein inclination angles of the first and second rotary polygon mirrors range from 5° to 40°.

5. An optical scanning device according to claim 1, wherein an arrangement direction of the first rotary polygon mirror and the second rotary polygon mirror is substantially parallel to the reference plane.

6. An image forming apparatus comprising:
- a first rotary polygon mirror which deflects and scans a first laser beam, to thus form an electrostatic latent image on a first image carrier;
- a second rotary polygon mirror which deflects and scans a second laser beam, to thus form an electrostatic latent image on a second image carrier;
- a plurality of mirrors which reflect thereon the laser beams deflected and scanned by the first and second rotary polygon mirrors;
- an optical box which houses therein the first and second rotary polygon mirrors and the plurality of mirrors;
- a plurality of developing devices which respectively develop the electrostatic latent image on the first image carrier and the electrostatic latent image on the second image carrier into a toner image; and
- a plurality of transferring units which respectively transfer the toner image formed on the first image carrier and the toner image formed on the second image carrier onto a member to be transferred;
- wherein a rotational axis of the first rotary polygon mirror and a rotational axis of the second rotary polygon mirror are inclined toward the same side, as viewed in directions of center axes of the first and second image carriers with respect to a direction perpendicular to a reference plane inclusive of the plurality of transferring units, and
- wherein the first rotary polygon mirror deflects and scans a third laser beam, to thus form an electrostatic latent image on a third image carrier, and the second rotary polygon mirror deflects and scans a fourth laser beam, to thus form an electrostatic latent image on a fourth image carrier.

7. An optical scanning device according to claim 6, wherein the third laser beam is deflected by the first rotary polygon mirror in an opposite direction of the first laser beam, and
wherein the fourth laser beam is deflected by the second rotary polygon mirror in an opposite direction of the second laser beam.

8. An optical scanning device according to claim 6, wherein some mirrors among the mirrors disposed between the first and second rotary polygon mirrors overlap each other with respect to a direction perpendicular to the reference plane inclusive of each of the center axes of the members to be scanned.

9. An image forming apparatus according to claim 6, wherein the member to be transferred is an intermediate transfer member which carries toner images transferred from the first image carrier and the second image carrier.

10. An image forming apparatus according to claim 6, wherein inclination angles of the first and second rotary polygon mirrors range from 5° to 40°.

11. An image forming apparatus according to claim 6, wherein an arrangement direction of the first rotary polygon mirror and the second rotary polygon mirror is substantially parallel to the reference plane.

* * * * *